US009565796B1

(12) United States Patent
Bush

(10) Patent No.: US 9,565,796 B1
(45) Date of Patent: Feb. 14, 2017

(54) TOP SURFACE MOVER AND METHOD OF USE

(71) Applicant: Steve Bush, Milan, IL (US)

(72) Inventor: Steve Bush, Milan, IL (US)

( * ) Notice: Subject to any disclaimer, the term of this patent is extended or adjusted under 35 U.S.C. 154(b) by 146 days.

(21) Appl. No.: 13/741,314

(22) Filed: Jan. 14, 2013

Related U.S. Application Data

(60) Provisional application No. 61/586,116, filed on Jan. 12, 2012.

(51) Int. Cl.
*A01G 1/00* (2006.01)
*A01B 45/00* (2006.01)
*B66F 19/00* (2006.01)

(52) U.S. Cl.
CPC ............... *A01B 45/00* (2013.01); *A01G 1/004* (2013.01); *B66F 19/00* (2013.01)

(58) Field of Classification Search
CPC ...................................... A01G 1/004
USPC ............... 172/19; 47/65.9; 111/901
See application file for complete search history.

(56) References Cited

U.S. PATENT DOCUMENTS

| 3,023,717 | A | * | 3/1962 | Cline | 111/81 |
| 3,982,711 | A | * | 9/1976 | Bradley et al. | 242/559.3 |
| 4,306,832 | A | * | 12/1981 | Schmiesing | 414/718 |
| 4,382,743 | A | * | 5/1983 | Newell | 414/692 |
| 4,999,022 | A | * | 3/1991 | Veys | 414/718 |
| 5,542,478 | A | * | 8/1996 | Heiple | 172/782 |
| 5,673,513 | A | * | 10/1997 | Casimaty | 47/65.9 |
| 6,112,680 | A | * | 9/2000 | Hummer | 111/200 |
| 6,213,218 | B1 | * | 4/2001 | Miller | 172/19 |
| D676,878 | S | * | 2/2013 | Frachiseur | D15/27 |
| 8,794,342 | B1 | * | 8/2014 | Merkt | 172/1 |
| 2013/0186314 | A1 | * | 7/2013 | Carlson | 111/100 |

* cited by examiner

*Primary Examiner* — Robert Pezzuto
*Assistant Examiner* — Joel F. Mitchell
(74) *Attorney, Agent, or Firm* — Hamilton IP Law, PC; Jay R. Hamilton; Charles A. Damschen

(57) ABSTRACT

An illustrative embodiment of a top surface mover generally comprises a vertical portion engaged with a horizontal portion and an engagement pad. The horizontal portion may include a mounting member to engage the top surface mover with a prime mover. The vertical portion and horizontal portion may be of variable length so that the position of the engagement pad with respect to the prime mover may be variable in at least two dimensions. The illustrative embodiment of a top surface mover is complimentary to an illustrative embodiment of a method of use wherein the top surface mover is configured to position top surface pieces accurately.

14 Claims, 7 Drawing Sheets

TOP SURFACE MOVER AND METHOD OF USE

CROSS-REFERENCE TO RELATED APPLICATIONS

This application claims priority under 35 U.S.C. §119(e) of provisional U.S. Pat. App. Ser. No. 61/586,116 filed on Jan. 12, 2012, which is incorporated by reference herein in its entirety.

FIELD OF THE INVENTION

The present invention relates to an apparatus and method for positioning top surface materials, including floor cover and ground surface cover such as sod, and more specifically, for an apparatus and method that moves a top surface cover from a first position to a second position.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.171 (d)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

Figure 1:
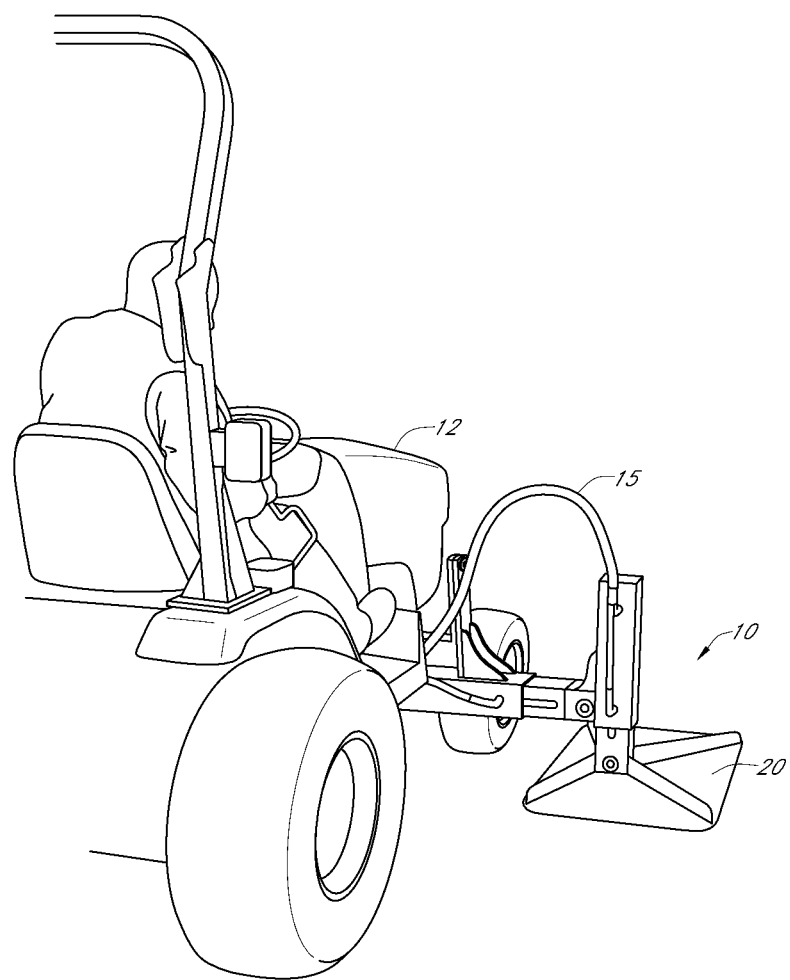
FIG. 1 is a perspective view of an illustrative embodiment of a top surface mover engaged with a tractor and configured for use with sod.

| DETAILED DESCRIPTION - ELEMENT LISTING | |
|---|---|
| Description | Element No. |
| Top Surface Mover | 10 |
| Tractor | 12 |
| Brace | 14 |
| Fluid conduit | 15 |
| Actuator | 16 |
| Ground surface | 17 |
| Top surface piece | 18 |
| Top surface gap | 19 |
| Engagement Pad | 20 |
| Connector portion | 22 |
| Surface engager | 24 |
| Engagement protrusion | 24a |
| Vertical portion | 30 |
| Vertical receiver | 32 |
| Vertical beam | 34 |
| Horizontal portion | 40 |
| Horizontal receiver | 42 |
| Horizontal beam | 44 |
| Horizontal/vertical interface | 45 |
| Mounting member | 46 |

DETAILED DESCRIPTION

Before the various embodiments of the present invention are explained in detail, it is to be understood that the invention is not limited in its application to the details of construction and the arrangements of components set forth in the following description or illustrated in the drawings.

The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Illustrative Embodiment

An illustrative embodiment of a top surface mover 10 is shown engaged with a tractor 12 in FIG. 1. The illustrative embodiment of a top surface mover 10 may be used to properly position a top surface piece 18, as will be described in detail below. Generally, the top surface mover 10 may comprise a vertical portion 30, a horizontal portion 40, and an engagement pad 20. The vertical portion 30 may include a vertical receiver 32 and a vertical beam 34 moveable with respect to the vertical receiver 32 along the longitudinal axis thereof. Similarly, the horizontal portion 40 may include a horizontal receiver 42 and a horizontal beam 44 moveable with respect to the horizontal receiver 42 along the longitudinal axis thereof.

The movement of the vertical beam 34 with respect to the vertical receiver 32 and/or the horizontal beam 44 with respect to the horizontal receiver 42 may be accomplished via one or more actuators 16, as shown in the illustrative embodiment of the top surface mover 10. The actuators 16 may be powered via a pressurized fluid originating at the tractor 12 and transported to the top surface mover 10 via fluid conduit 15. If actuators 16 are used, they may be positioned in the vertical receiver 32 and horizontal receiver 42, respectively, such that a first end of each actuator 16 is engaged with the receiver 32, 42 and the second end is engaged with the beam 34, 44.

In other embodiments the actuators 16 may be powered via electricity or any other suitable motive force. Furthermore, in still other embodiments of the top surface mover 10 the movement of the vertical beam 34 with respect to the vertical receiver 32 and/or the horizontal beam 44 with respect to the horizontal receiver 42 may be manually accomplished. Accordingly, the top surface mover 10 as disclosed and claimed herein is not limited by the structure and/or method used to cause the vertical beam to move with respect to the vertical receiver 32 and/or the horizontal beam 44 to move with respect to the horizontal receiver 42.

Figure 2A:
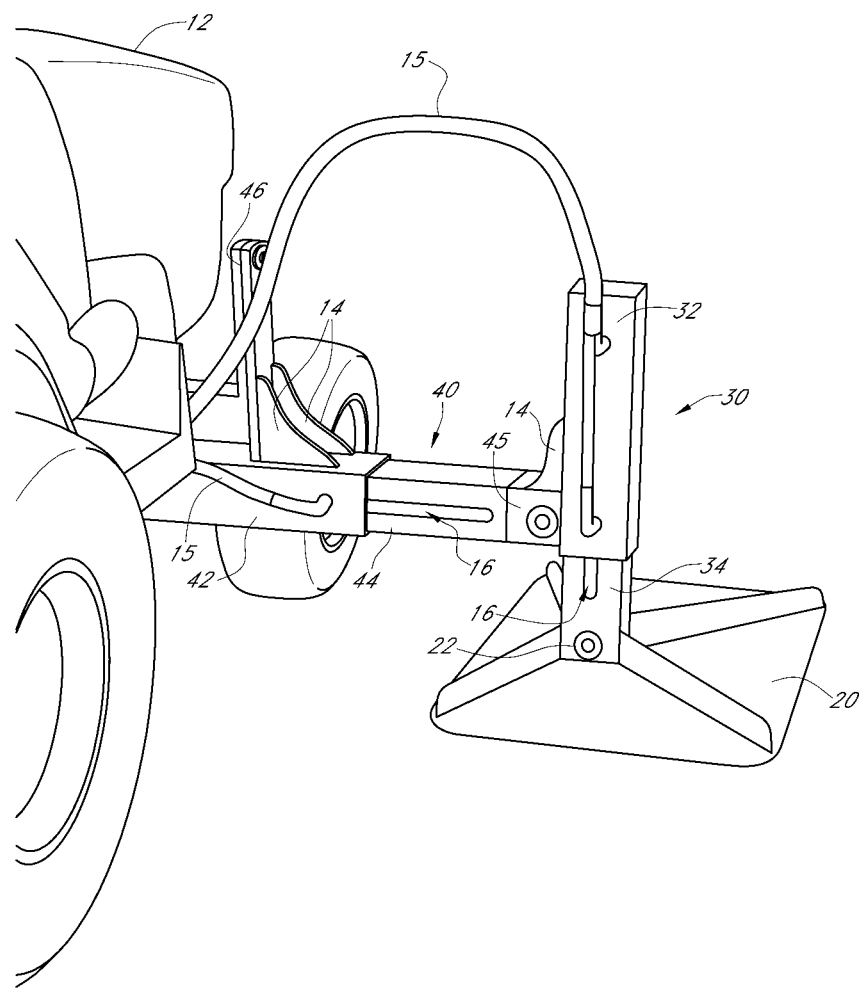
FIG. 2A is a perspective view of the illustrative embodiment of a top surface mover with the vertical portion and horizontal portion fully extended.
Figure 2B:
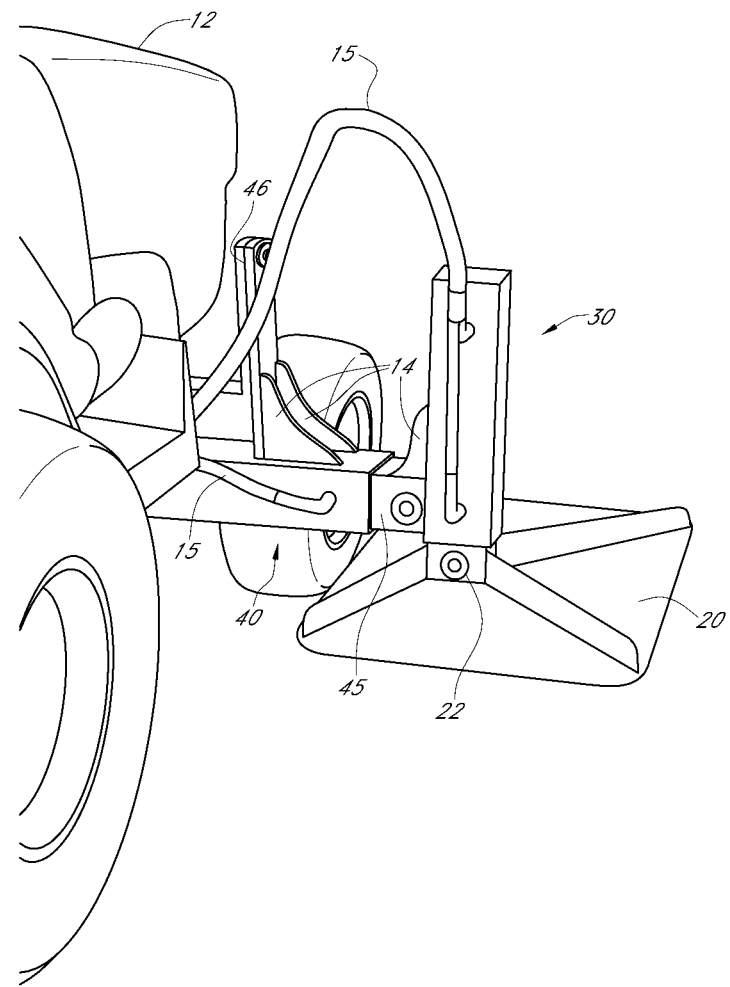
FIG. 2B is a perspective view of the illustrative embodiment of a top surface mover with the vertical portion and horizontal portion fully retracted.
Figure 3:
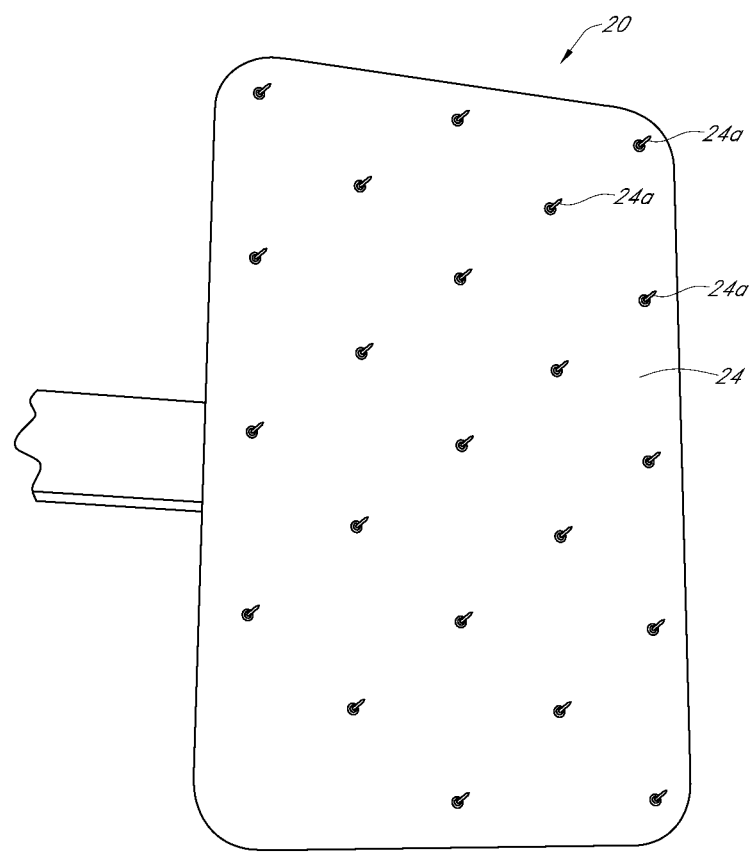
FIG. 3 is a detailed view of the surface engager portion of the engagement pad.

The illustrative embodiment of the top surface mover 10 is shown with the vertical beam 34 and horizontal beam 44 fully extended in FIG. 2A and the beams 34, 44 fully retracted in FIG. 2B. The optimal distance of travel of the vertical beam 34 with respect to the vertical receiver 32 and/or horizontal beam 44 with respect to the horizontal receiver 42 will vary from one application of the top surface mover 10 to the next, and is therefore in no way limiting to the scope thereof.

As clearly shown in FIGS. 1-2B, one end of the horizontal beam 44 may be cooperatively engaged with the vertical receiver 32 at a horizontal/vertical interface 45. In this configuration, extension of the horizontal beam 44 causes the vertical portion 30 to move in the same direction, and refraction of the horizontal beam 44 causes the vertical portion 30 to move in the same direction. It is contemplated that the horizontal portion 40 and engagement pad 20 may be configured so that the inside edge of the engagement pad 20 may be positioned inside the outer edge of the wheels of the prime mover. As is evident from the current disclosure, the top surface mover 10 may be configured such that the engagement pad 20 is moveable with respect to the prime mover in at least two dimensions.

A mounting member 46 may be engaged with the horizontal portion 40 to cooperatively engage the top surface mover 10 with a prime mover (e.g., tractor 12). In the illustrative embodiment of the top surface mover 10, the mounting member 46 may comprise a plate secured to the horizontal receiver 42 with apertures therein. Fasteners (such as bolts) may be used to align apertures in the mounting member 46 to apertures in the prime mover and thereby engage the top surface mover 10 with the prime mover. If additional robustness is required, one or more braces 14 may be used to engage the mounting member 46 with the horizontal portion 40. Additionally, a portion of the horizontal receiver 42 may be engaged with the prime mover if more rigidity, strength, and/or robustness is required. Any structure and/or method suitable for the particular application of the top surface mover 10 may be used to engage the top surface mover 10 with a prime mover, and therefore the specific structure and/or method used therefor in no way limits the scope of the top surface mover as disclosed and claimed herein.

An engagement pad 20 may be cooperatively engaged with one end of the vertical beam 34 at a connector portion 22 of the engagement pad 20. The connector portion 22 may rigidly engage with engagement pad 20 with the vertical beam 34, or it may be configured to allow a small amount of movement (e.g., 1-10 degrees of slope) between the engagement pad 20 and the vertical beam 34. The engagement pad 20 may be formed with a surface engager 24 on the bottom surface thereof, and a plurality of engagement protrusions 24a may extend outward from the surface engager. The optimal number of protrusions 24a will vary from one embodiment of the top surface mover 10 to the next, as will the specific distance from which the surface engager 24 the protrusions 24a extend. However, it is contemplated that in some applications the optimal length of the engagement protrusions 24a will be such that when the surface engager 24 is fully engaged with a top surface piece 18, the distal ends of the engagement protrusions 24a do not contact the ground surface 17. This dimension will depend on the thickness of the top surface piece 18, but in most applications will be between 0.1 inches and 2.0 inches. In this configuration, extension of the vertical beam 34 causes the engagement pad 20 to move in the same direction, and retraction of the vertical beam 34 causes the engagement pad 20 to move in the same direction.

Illustrative Method of Use

Having described a preferred embodiment of the top surface mover 10, one method of using the top surface mover 10 will now be described. Generally, the top surface mover 10 may be adapted to properly position a top surface piece 18. The illustrative method of use described herein is generally directed toward a top surface piece 18 configured as a piece of grass sod. However, the present disclosure is not so limited and includes embodiments configured for positioning any top surface piece 18 for which a top surface mover 10 may be advantageous.

Figure 4A:
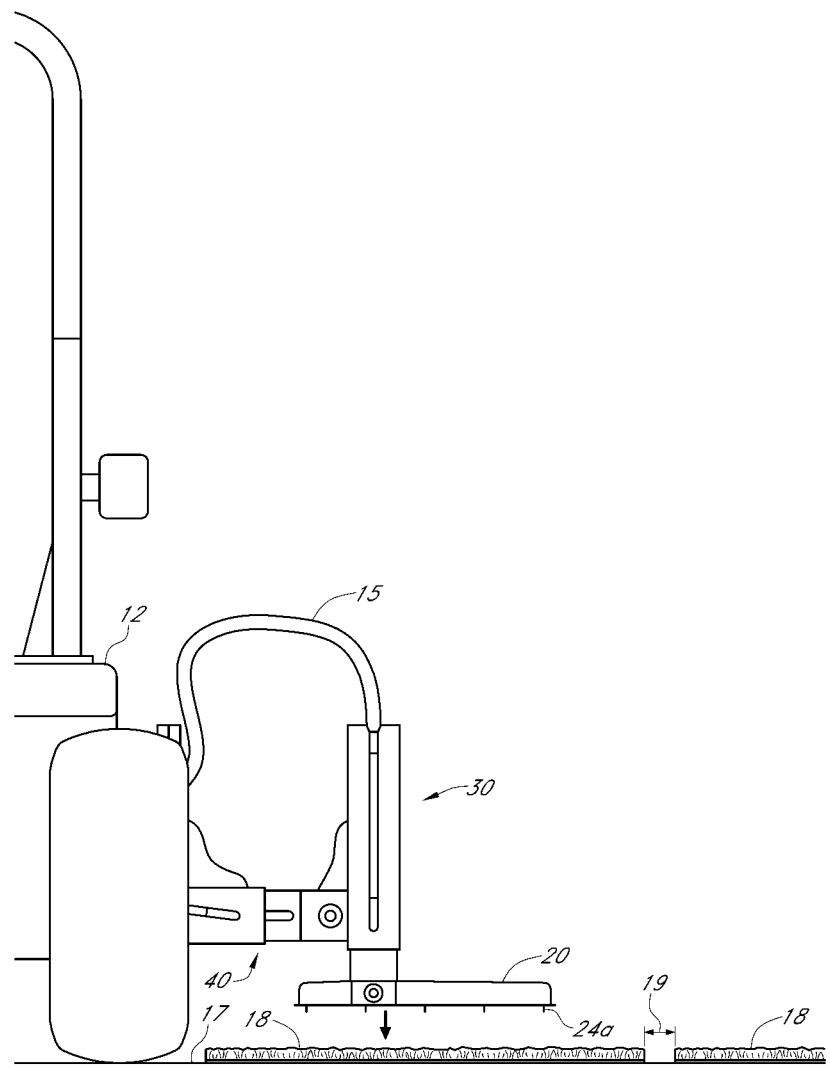
FIG. 4A is a side view of the illustrative embodiment of a top surface mover prior to engaging a top surface piece.
Figure 4B:
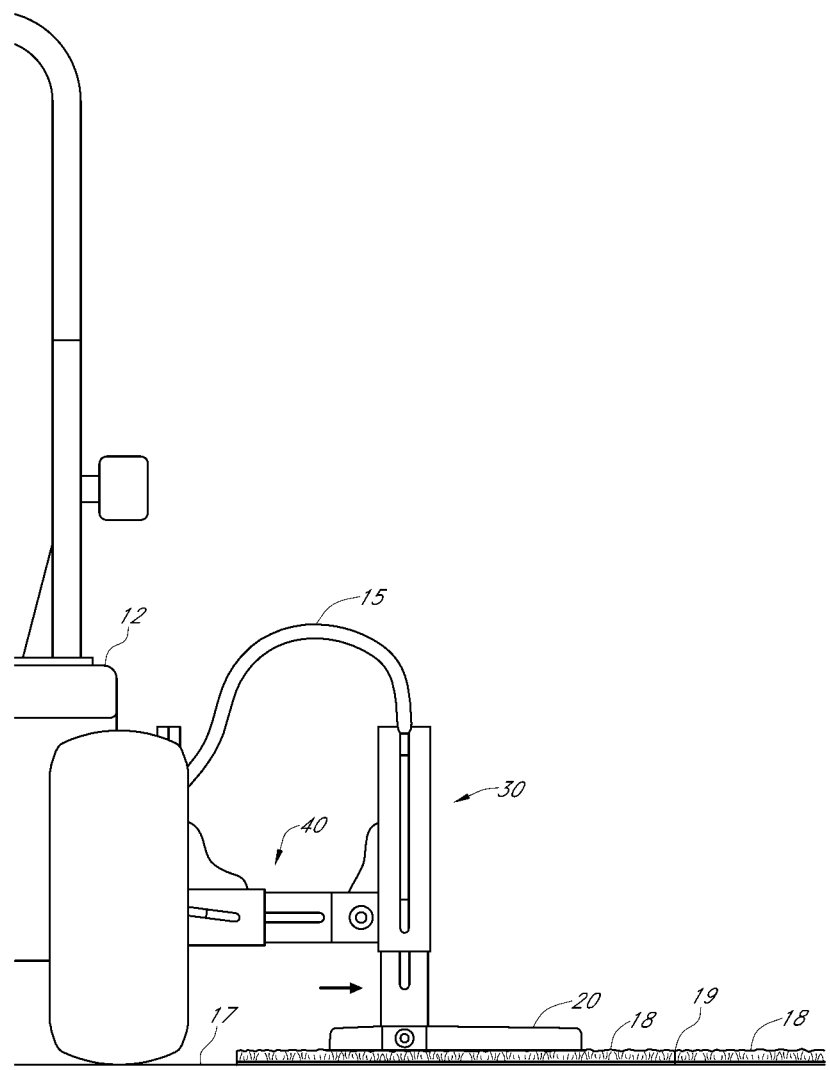
FIG. 4B is a side view of the illustrative embodiment of a top surface mover engaging a top surface piece and sliding it across the ground surface toward an existing top surface piece.
Figure 4C:
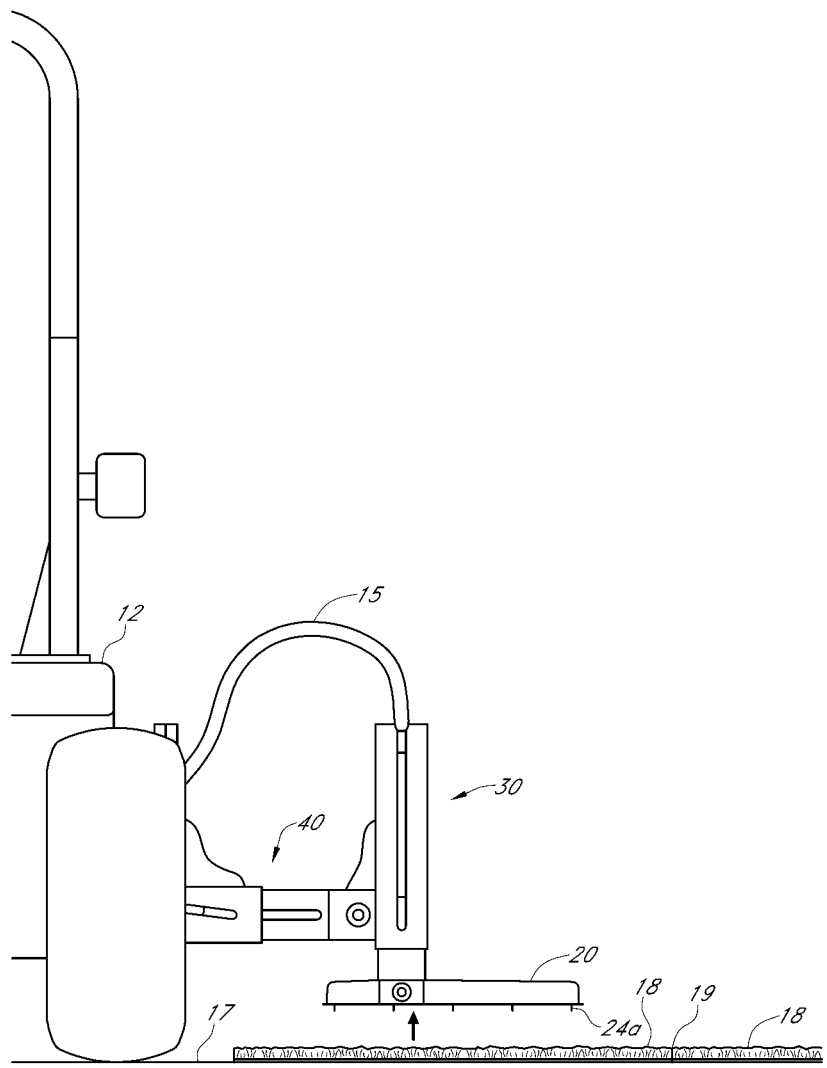
FIG. 4C is a side view of the illustrative embodiment of a top surface mover after engaging a top surface piece.

Generally, when laying sod, sections of sod are unrolled onto the ground surface 17 and positioned adjacent on another to close all top surface gaps 19 that may exist between two top surface pieces 18. FIG. 4A shows a top surface piece 18 after it has been unrolled and generally positioned adjacent properly placed top surface piece 18. As shown, a top surface gap 19 exists between the unrolled top surface piece 18 and the properly positioned top surface piece 18.

The user may move the prime mover until the engagement pad 20 is approximately centered over the top surface piece 18. This may require extending and/or retracting the horizontal beam 44 and/or moving the prime mover forward or backward. Once the user is satisfied with the position of the engagement pad 20 with respect to the unrolled top surface piece 18, the user may extend the vertical beam 34 so that the surface engager 24 touches the top surface piece 18 and the engagement protrusions 24a extend into the top surface piece 18.

Once the engagement pad 20 is fully engaged with the top surface piece 18, the user may extend or retract the horizontal beam 44 as needed to slide the top surface piece along the ground surface 17 and close the top surface gap. In this way, the top surface mover 10 is functional to position the top surface piece 18 from side to side. When the engagement pad 20 is fully engaged with the top surface piece 18, the user may also adjust the position of the top surface piece 18 in the fore-aft dimension by moving the prime mover forward or backward.

After the top surface piece 18 is properly positioned, the user may retract the vertical beam 34, thereby disengaging the engagement pad 20 and the top surface piece 18. At this point, the user may move to the next top surface piece 18 and repeat any necessary steps required to properly position that top surface piece 18 and close/adjust any top surface gaps 19 associated therewith. Using this method, the top surface gaps 19 around the various top surface pieces 18 may be virtually invisible, leading to improved outcome in ground surface coverage, affixation to the ground surface, 17 and improved aesthetics.

Having described the preferred embodiments, other features of the top surface mover 10 and method of use will undoubtedly occur to those versed in the art, as will numerous modifications and alterations in the embodiments as illustrated herein, all of which may be achieved without departing from the spirit and scope of the top surface mover 10 and/or method of use as disclosed herein. It should be noted that the top surface mover 10 and method of use are not limited to the specific embodiments pictured and described herein, but are intended to apply to all similar apparatuses and methods for positioning a top surface piece. Modifications and alterations from the described embodiments will occur to those skilled in the art without departure from the spirit and scope of the top surface mover 10 and/or method of use.

The invention claimed is:

1. A method of positioning a top surface piece, said method comprising:
    a. placing a first top surface piece on a ground surface;
    b. unrolling a second top surface piece on said ground surface adjacent said first top surface piece such that a top surface gap exists between a first edge of said first top surface piece and a first edge of said second top surface piece;
    c. sliding said second top surface piece toward said first top surface piece with a top surface mover until said top surface gap is closed, said top surface mover comprising:
        i. a horizontal portion comprising:
            1. a horizontal receiver;
            2. a horizontal beam slideable with respect to and extendable from said horizontal receiver;
            3. a horizontal/vertical interface at a distal end of said horizontal beam;
        ii. a vertical portion rigidly affixed to said horizontal portion at said horizontal/vertical interface such that said vertical portion and said horizontal portion are perpendicular with respect to one another and such that the angular orientation between said vertical portion and said horizontal portion is fixed, wherein said vertical portion comprises:
            1. a vertical receiver, wherein said vertical receiver is directly affixed to said horizontal/vertical interface such that said vertical receiver is immovable with respect to said horizontal/vertical interface, and wherein movement of said horizontal beam with respect to said horizontal receiver results in the same relative movement of said vertical receiver with respect to said horizontal receiver;
            2. a vertical beam slideable with respect to and extendable from said vertical receiver;
        iii. an engagement pad cooperatively engaged with a first end of said vertical beam, wherein said engagement pad comprises:
            1. a connector portion on the top surface thereof;
            2. a surface engager on the bottom surface thereof; and
            3. at least one engagement protrusion extending downward from said surface engager, and wherein said engagement pad directly engages said second top surface piece
    d. disengaging said top surface mover from said second top surface piece.

2. The method of positioning a top surface piece according to claim 1 wherein said first top surface piece is further defined as a pre-cut portion of sod.

3. The method of positioning a top surface piece according to claim 2 wherein said sliding step further comprises:
    a. positioning said engagement pad so it is positioned above said second top surface piece:
    b. extending said vertical beam until said at least one engagement protrusion is positioned within said second top surface piece; and,
    c. extending said horizontal beam.

4. The method of positioning a top surface piece according to claim 3 wherein said disengaging step further comprises retracting said vertical beam until said at least one protrusion is no longer contacting said second top surface piece.

5. The method of positioning a top surface piece according to claim 4 wherein said method further comprises:
    a. unrolling a third top surface piece on said ground surface adjacent a second edge of said second top surface piece such that a second top surface gap exists between said second edge of said second top surface piece and a first edge of said third top surface piece;
    b. sliding said third top surface piece toward said second top surface piece with said top surface mover until said second top surface gap is closed.

6. The method of positioning a top surface piece according to claim 5 wherein said method further comprises:
    a. positioning said engagement pad so it is positioned above said third top surface piece:
    b. extending said vertical beam until said at least one engagement protrusion is positioned within said third top surface piece; and,
    c. moving said top surface mover forward.

7. The method of positioning a top surface piece according to claim 6 wherein said moving step is further defined as being accomplished via a prime mover to which said top surface mover is cooperatively engaged.

8. The method of positioning a top surface piece according to claim 7 wherein said top surface mover further comprises a first actuator positioned in said horizontal receiver, wherein said first actuator is fluidly connected to said prime mover via at least one fluid conduit, and wherein said first actuator is configured to extend and retract said horizontal beam with respect to said horizontal receiver.

9. The method of positioning a top surface piece according to claim 8 wherein said top surface mover further comprises a second actuator positioned in said vertical receiver, wherein said second actuator is fluidly connected to said prime mover via at least one fluid conduit, and wherein said second actuator configured to extend and retract said vertical beam with respect to said vertical receiver.

10. The method according to claim 1 wherein said top surface mover further comprises a brace positioned at said horizontal/vertical interface, wherein said brace is affixed to both said horizontal beam and said vertical receiver.

11. A method of positioning a top surface piece, said method comprising:
    a. engaging a top surface mover with a prime mover, wherein said top surface mover comprises:

i. a horizontal portion this is generally perpendicular with respect to a longitudinal axis of said prime mover, said horizontal portion comprising:
1. a horizontal receiver;
2. a horizontal beam slideable with respect to and extendable from said horizontal receiver;
3. a horizontal/vertical interface at a distal end of said horizontal beam;

ii. a vertical portion rigidly affixed to said horizontal portion at said horizontal/vertical interface such that said vertical portion and said horizontal portion are perpendicular with respect to one another, wherein said vertical portion comprises:
1. a vertical receiver, wherein said vertical receiver is directly affixed to said horizontal/vertical interface such that said vertical receiver is immovable with respect to said horizontal/vertical interface, and wherein movement of said horizontal beam with respect to said horizontal receiver results in the same relative movement of said vertical receiver with respect to said horizontal receiver;
2. a vertical beam slideable with respect to and extendable from said vertical receiver;

iii. an engagement pad cooperatively engaged with a first end of said vertical beam, wherein said engagement pad comprises:
1. a connector portion on the top surface thereof;
2. a surface engager on the bottom surface thereof; and
3. at least one engagement protrusion extending downward from said surface engager, and wherein said engagement pad directly engages said second top surface piece;

b. placing a first top surface piece on a ground surface;
c. placing a second top surface piece on said ground surface adjacent said first top surface piece such that a top surface gap exists between a first edge of said first top surface piece and a first edge of said second top surface piece;
d. positioning said engagement pad of said top surface mover over said first top surface piece via moving said prime mover;
e. engaging said engagement pad of said top surface mover with said second top surface piece via extending said vertical beam downward from said vertical receiver until said at least one engagement protrusion is positioned within said second top surface piece;
f. sliding said second top surface piece toward said first top surface piece with a top surface mover until said top surface gap is closed via extending said horizontal beam with respect to said horizontal receiver; and,
g. disengaging said top surface mover from said second top surface piece via retracting said vertical beam with respect to said vertical receiver until said at least one engagement protrusion is no longer positioned within said second top surface piece.

12. The method of positioning a top surface piece according to claim 7 wherein said top surface gap is further defined as being oriented generally parallel with respect to said longitudinal axis.

13. The method of positioning a top surface piece according to claim 12 wherein said step of sliding said second top surface piece toward said first top surface piece is further defined as moving said second top surface piece in a direction that is generally perpendicular with respect to said longitudinal axis of said prime mover.

14. The method according to claim 11 wherein said top surface mover further comprises a brace positioned at said horizontal/vertical interface, wherein said brace is affixed to both said horizontal beam and said vertical receiver.

* * * * *